United States Patent [19]
Berg et al.

[11] Patent Number: 5,657,516
[45] Date of Patent: Aug. 19, 1997

[54] DUAL STRUCTURED FASTENER ELEMENTS

[75] Inventors: James G. Berg, Lino Lakes; Jennifer M. Aamodt, Woodbury; Clyde D. Calhoun, Grant Township, Washington County; Harlan L. Krinke, May Township, Washington County, all of Minn.

[73] Assignee: Minnesota Mining and Manufacturing Company, St. Paul, Minn.

[21] Appl. No.: 542,311

[22] Filed: Oct. 12, 1995

[51] Int. Cl.⁶ .................................................. A44B 18/00
[52] U.S. Cl. ........................... 24/452; 24/306; 24/442; 24/576
[58] Field of Search .......................... 24/452, 442, 306, 24/575, 576, 577, 578, 587

[56] References Cited

U.S. PATENT DOCUMENTS

| | | |
|---|---|---|
| 281,760 | 7/1883 | Gingras . |
| 1,212,262 | 1/1917 | Rockwell . |
| 1,214,261 | 1/1917 | Balbach . |
| 1,342,979 | 6/1920 | Beitner . |
| 1,887,913 | 11/1932 | Bell . |
| 1,954,242 | 4/1934 | Heppenstall . |
| 2,144,755 | 1/1939 | Freedman . |
| 2,487,400 | 11/1949 | Tupper . |
| 2,499,898 | 3/1950 | Anderson . |
| 2,558,367 | 6/1951 | Madsen . |
| 2,717,437 | 9/1955 | de Mestral . |
| 2,780,261 | 2/1957 | Svec et al. . |
| 2,794,228 | 6/1957 | Teher ............................ 24/576 |
| 2,895,753 | 7/1959 | Fentiman . |
| 3,000,658 | 9/1961 | Sprouse . |
| 3,009,235 | 11/1961 | de Mestral . |
| 3,039,340 | 6/1962 | Livermont . |
| 3,054,434 | 9/1962 | Ausnit et al. . |
| 3,173,184 | 3/1965 | Ausnit . |
| 3,182,345 | 5/1965 | Smith . |
| 3,192,589 | 7/1965 | Pearson . |
| 3,198,228 | 8/1965 | Naito . |
| 3,266,113 | 8/1966 | Flanagan . |
| 3,335,774 | 8/1967 | Reed . |
| 3,369,265 | 2/1968 | Halberstadt et al. . |
| 3,408,705 | 11/1968 | Kayser et al. . |
| 3,618,802 | 11/1971 | Yates . |
| 3,633,642 | 1/1972 | Siegel . |
| 3,719,003 | 3/1973 | Skjoldborg . |
| 3,730,382 | 5/1973 | Heisler . |
| 3,817,420 | 6/1974 | Heisler . |
| 3,899,805 | 8/1975 | McMillan . |
| 4,581,792 | 4/1986 | Spier . |
| 4,615,084 | 10/1986 | Erb ................................ 24/306 |
| 4,699,622 | 10/1987 | Toussant et al. . |
| 4,716,069 | 12/1987 | Burke . |
| 4,743,242 | 5/1988 | Grube et al. . |
| 4,794,674 | 1/1989 | Mintel et al. . |
| 4,817,816 | 4/1989 | Leseman et al. . |
| 4,819,309 | 4/1989 | Behymer . |
| 4,846,815 | 7/1989 | Scripps . |
| 4,861,635 | 8/1989 | Carpenter et al. . |
| 4,872,243 | 10/1989 | Fischer . |
| 4,875,259 | 10/1989 | Appeldorn . |
| 4,887,339 | 12/1989 | Bellanger . |
| 4,959,265 | 9/1990 | Wood et al. . |

(List continued on next page.)

FOREIGN PATENT DOCUMENTS

| | | |
|---|---|---|
| 0 497 620 | 8/1992 | European Pat. Off. . |
| 0477940 | 12/1953 | Italy ............................. 24/576 |
| 0659970 | 10/1957 | United Kingdom ............. 24/576 |

*Primary Examiner*—Victor N. Sakran
*Attorney, Agent, or Firm*—Gary L. Griswold; Walter N. Kirn; Lucy C. Weiss

[57] ABSTRACT

A fastener and a method of fastening articles employing the fastener are provided. The fastener includes a fastener element adapted to be mated in an interlocking arrangement to a complementary fastener element. The fastener element has a plurality of mating cavities. The mating cavities include a mating surface which is adapted to interlockingly engage a mating element projecting from the complementary fastener element.

27 Claims, 10 Drawing Sheets

U.S. PATENT DOCUMENTS

| | | |
|---|---|---|
| 4,963,140 | 10/1990 | Robertson et al. . |
| 4,979,613 | 12/1990 | McLaughlin et al. . |
| 4,988,555 | 1/1991 | Hedblom . |
| 5,071,363 | 12/1991 | Reylek et al. . |
| 5,088,164 | 2/1992 | Wilson et al. . |
| 5,097,570 | 3/1992 | Gershenson . |
| 5,101,539 | 4/1992 | Kennedy et al. ............ 24/442 |
| 5,113,555 | 5/1992 | Wilson et al. . |
| 5,158,557 | 10/1992 | Noreen et al. . |
| 5,201,101 | 4/1993 | Rouser et al. . |
| 5,212,853 | 5/1993 | Kaneko ............ 24/442 |
| 5,212,855 | 5/1993 | McGanty . |
| 5,221,276 | 6/1993 | Battrell . |

DUAL STRUCTURED FASTENER ELEMENTS

BACKGROUND OF THE INVENTION

A variety of ways have been devised to fasten articles together. For example, it has been proposed to taper the sides of a shaft so that a head portion consisting of, for example, a toothbrush or tool, may be attached, while permitting removal and interchange of the head portion, as disclosed in U.S. Pat. Nos. 1,887,913 (Bell), 3,039,340 (Livermont), 3,182,345 (Smith) and 3,369,265 (Halberstadt et al.). Also, intermeshing joints have been utilized for connecting in woodworking, as disclosed in U.S. Pat. Nos. 1,212,262 (Rockwell), 1,214,261 (Balbach), 1,342,979 (Beitner) and 1,954,242 (Heppenstall), and in metal working, as disclosed in U.S. Pat. Nos. 2,895,753 (Fentiman) and 3,000,658 (Sprouse). Further, inclined or tapered shafts have been utilized for interconnecting the ends of leather washers, as illustrated in U.S. Pat. No. 281,760 (Gingras). However, all of the above have utilized a single shaft and, in some instances, either provided protruding elements along the sides or a T-shaped like-end to provide additional mechanical interference to enhance fastening.

Containers of the type commonly known as "Tupperware" containers (Tupperware is a registered trademark of Kraft, Inc.) and similar containers are disclosed, for example, in U.S. Pat. Nos. 2,487,400 (Tupper), 3,335,774 (Reed), 3,618,802 (Yates, Jr.), 3,730,382 (Heisler), and 3,817,420 (Heisler). The covers of such containers are precisely sized and when mounted, the covers are stretched to cause a tension to be developed in the cover rims between inner and outer retaining lip portions to provide mechanical interlocking for closure. A related patent, U.S. Pat. No. 4,819,309 (Bayemer) discloses that the two parts of a fastener may be identical thereby creating what is referred to as a self-mating fastener.

A number of fasteners utilizing a plurality of longitudinally extending rib and groove elements which deform, mechanically interfere and resiliently interlock with each other have also been disclosed. Examples of such fasteners are described in U.S. Pat. Nos. 2,144,755 (Freedman), 2,558,367 (Madsen), 2,780,261 (Svecedahl), 3,054,434 (Ausnit et al.), 3,173,184 (Ausnit), 3,198,228 (Nato), and 3,633,642 (Segal).

Other fasteners are based on the use of an adhesive. Examples of fasteners that use adhesives as part of the active closure surface are disclosed in U.S. Pat. Nos. 4,699,622 (Toussant et al.), 4,743,242 (Grube et al.), 4,817,816 (Leseman et al.), 4,861,635 (Carpenter et al.), 4,959,265 (Wood et al., 5,158,557 (Noreen et al.) and 5,221,176 (Battrell et al.).

There are also a number of mechanical fasteners based on the interaction of multiple engaging elements. One group of such fasteners includes the hook-to-hook fastener disclosed in U.S. Pat. No. 2,717,437 (Mestral), the hook-to-loop fastener described in U.S. Pat. No. 3,009,235 (Mestral), and the headed stem or mushroom-to-loop fastener disclosed in U.S. Pat. No. 4,846,815 (Scripps).

Another group of related patents describe fasteners which include functional surfaces with patterns of interlocking elements. The interlocking elements have contoured heads in a variety of shapes which fit into cavities between the base or stem of the complimentary functional surface of the fastener. Normally these fasteners are self-mating and often the headed portion of the elements is larger in diameter or a cross section than the space between heads on the complimentary functional surface. Examples of this type of fastener are illustrated in U.S. Pat. Nos. 2,499,898 (Anderson), 3,192,589 (Pearson), 3,266,113 (Flanagan, Jr.), 3,408,705 (Kayser et al.) and 5,097,570 (Gershenson). U.S. Pat. No. 3,899,805, which discloses the use of hollow-headed interacting elements, is a variation of this type of approach. All of these fasteners based on the mechanical interaction of a multiplicity of elements function by fitting an expanded region of an element on one functional surface into a seat or cavity which is a reduced cross-section or restricted pocket on the complementary functional surface. The joining of this type of fastener is normally associated with a single or double snap as the fastener is engaged.

Another type of mechanical fastener that is self-mating and has a multiplicity of intermeshing solid protrusions is disclosed by U.S. Pat. No. 4,875,259 (Appeldorn). Fasteners of the type described in Appeldorn do not make use of interacting elements with expanded heads. Rather, the bond between the complementary functional surfaces of the fastener is due to frictional forces generated between contacting surfaces of the intermeshing protrusions on each of the functional surfaces. The sides of the intermeshing protrusions consist of optically smooth flats. Examples of other fasteners of this type may be found in U.S. Pat. Nos. 5,071,363 (Reylek et al.), 5,088,164 (Wilson et al.), 5,113,555 (Wilson et al.), and 5,201,101 (Rouser et al.).

Yet another self-mating fastener which functions by engaging projections on one functional surface into receptacles on a complementary functional surface to form a releasable friction fit is disclosed in U.S. Pat. No. 4,581,892 (Spier). The projections on one surface perforate a web on the second surface and alternate in rows from one side of the web to the other.

Because of the wide variety of potential applications for fasteners there is a continued demand for new fasteners having enhanced performance with regard to a wide variety of factors, e.g., the number of closures, engagement and disengagement forces, noise, relative movement between fastener surfaces, washability, resistance to soiling or contamination, and the level of load or shear stress the fastener will support. There is a continued need for the development of fasteners having enhanced properties with regard to one or more of these factors that will also satisfy requirements concerning ease of manufacture and constraints on cost.

SUMMARY OF THE INVENTION

The present invention provides a fastener and a method of fastening articles employing the fastener. The fastener includes a fastener element and a complementary fastener element. The fastener element and complementary fastener element may either be portions of a single structure or may consist of two separate components. The fastener element includes a polymeric substrate having a plurality of mating cavities which include a first mating surface. A cross-section perpendicular to the first mating surface includes a plurality of first microprotrusions extending from the first mating surface. The microprotrusions may include discontinuous microprotrusions, e.g., discrete microprotrusions of regular or amorphous shape. In other embodiments of the invention, the microprotrusions may include continuous microprotrusions, e.g., a ridge extending from the sides of a post in a screw thread configuration. Typically, the first mating cavities are defined by adjacent first mating elements projecting from the polymeric substrate.

The complementary fastener element includes a polymeric substrate having a plurality of second mating elements projecting therefrom. The second mating elements include a mating surface such that a cross-section perpendicular to the second mating surface includes a plurality of second microprotrusions extending from the second mating surface.

When the first and second fastener elements are engaged, at least one mating element projecting from the second fastener element is interlockingly retained in a mating cavity defined by adjacent mating elements on the first fastener element. The fastener elements typically may be releasably engaged with each other. This permits the fastener to be used in applications requiring a fastener which can be repeatedly joined and separated.

The fasteners of the present invention have a wide assortment of potential applications, such as a fastener on a reclosable container, in place of a button or zipper on clothing or to attach an object to a dissimilar article. The fasteners allow articles to be fastened in a variety of positions and may not require any particular alignment prior to connection. The present invention also permits the construction of fasteners having a direct, continuous relationship between engagement and disengagement forces.

DETAILED DESCRIPTION OF THE INVENTION

Figure 1:
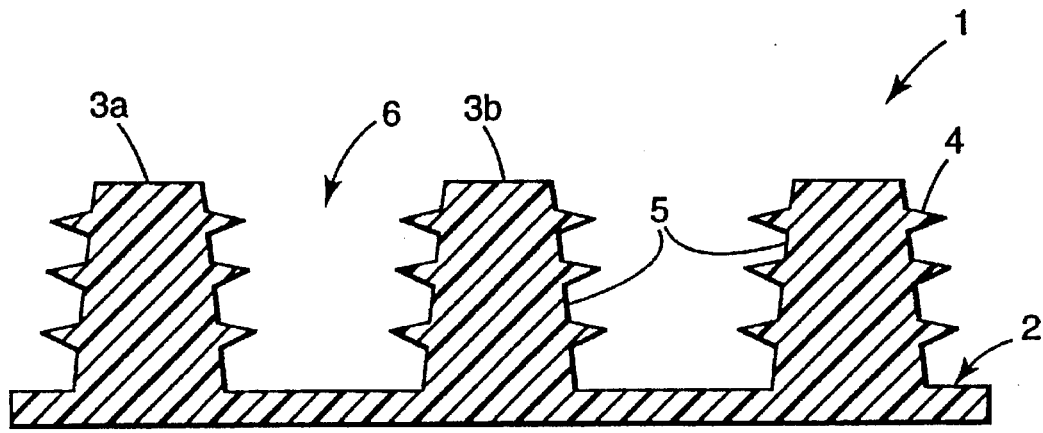
FIG. 1 shows cross-sectional view of a fastener element of the present invention.

FIG. 1 depicts a cross-sectional view of a portion of a dual structured fastener element of the present invention. The fastener element consists of a unitary polymeric substrate 1 which includes a base 2 and solid mating elements 3 projecting from the base. The cross-sectional view shows microprotrusions 4 extending from the sides ("mating surfaces") 5 of mating elements 3. Adjacent mating elements 3a, 3b define a mating cavity 6 which is capable of receiving and interlockingly engaging a suitably sized mating element projecting from a second ("complementary") fastener element.

Figure 2A:
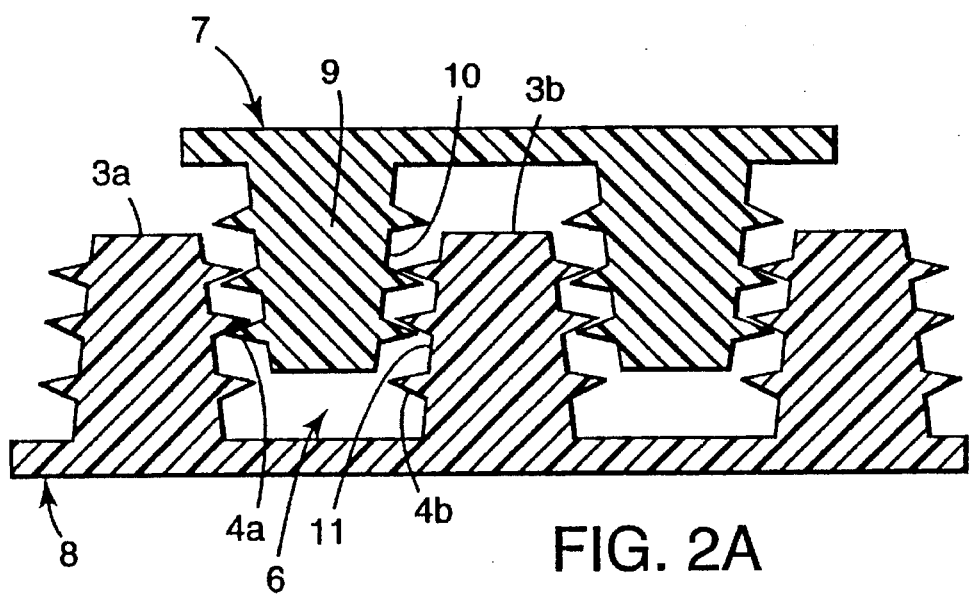
FIG. 2A shows a cross-sectional view of first and second fastener elements of the type depicted in FIG. 1 just after being brought into contact.
Figure 2B:
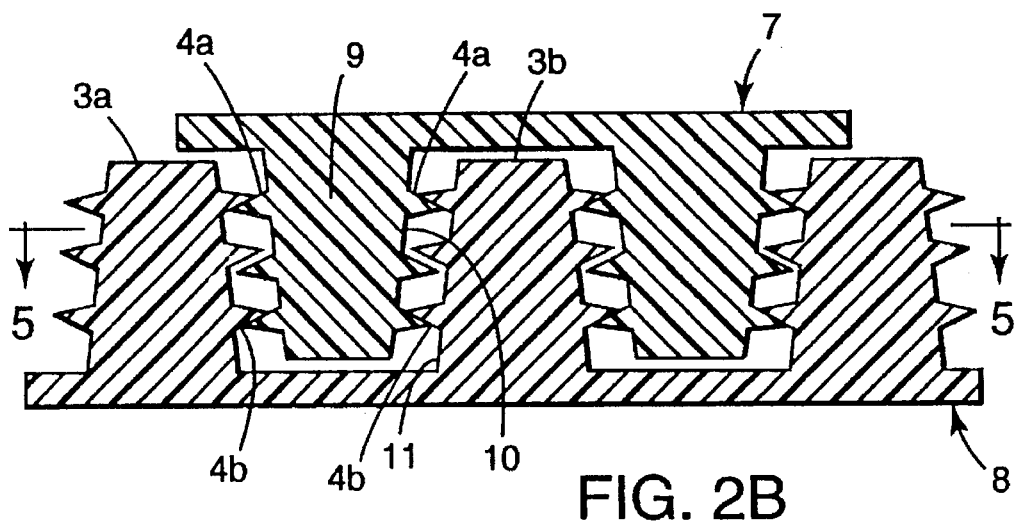
FIG. 2B shows a cross-sectional view of first and second fastener elements of the type depicted in FIG. 1 interlockingly engaged.

FIGS. 2A and 2B schematically depict the interaction between two like fastener elements as they are brought into contact with each other. In FIG. 2A, the two fastener elements 7, 8 have been pressed together such that only a fraction of the microprotrusions 4a, 4b on each of the mating surfaces are interlockingly engaged. As additional force is exerted on fastener elements 7, 8, mating element 9 projecting from second fastener element 7 is driven deeper into mating cavity 6, which is defined by adjacent mating elements 3a, 3b projecting from first fastener element 8. The force required to disengage fasteners of the type shown in FIGS. 2A and 2B is typically proportional to the engagement force applied to the fastener. Application of a relatively moderate engagement force results in projecting element 9 only being partially pressed into mating cavity 6 (see e.g., FIG. 2A). As additional force is applied to the fastener elements, mating element 9 is forced deeper into mating cavity 6 and the number of microprotrusions 4a on mating surfaces 10 which become interlockingly engaged with microprotrusions 4b on mating surfaces 11 increases. The force required to disengage fastener elements 7 and 8 from each other thus correspondingly increases.

The mating elements projecting from the present fastener elements may have a wide variety of shapes and orientations. The mating elements may include any one of a number of regular geometric shapes, such as triangular pyramids, posts having a regular polygonal cross-section or fructoconical posts. Alternatively, the mating elements may include randomly oriented projections having an amorphous shape. Other suitable examples of mating elements which may be present on the fastener elements of the invention include spherical or spheroidal shapes.

The size and shape of the microprotrusions will vary somewhat as a function of the draft angle of the mating elements. In general, in order to be capable of interlocking engagement, mating elements whose sides have a larger draft angle require somewhat larger microprotrusions. The present mating elements typically include at least one side having a relatively steep draft. For example, mating elements having a draft of less than about 30° (with respect to a vector perpendicular to the major surface of the polymeric substrate) may be employed. Fastener elements including mating elements having a sidewall which is quite close to being vertical, i.e., having a draft of less than about 10°, are included within the present invention.

Figure 3:
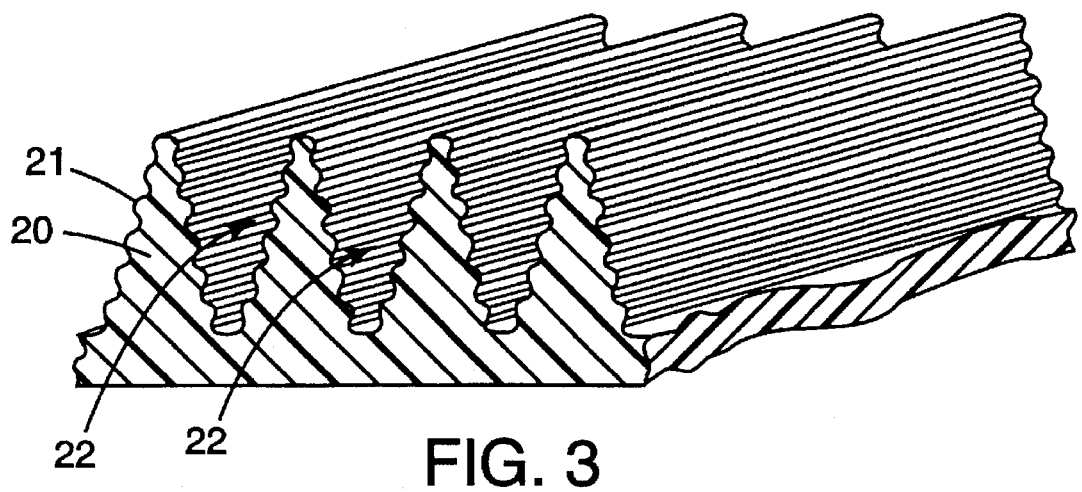
FIG. 3 shows a cross-sectional view of a portion of an alternate embodiment of a fastener element of the present invention.
Figure 4:
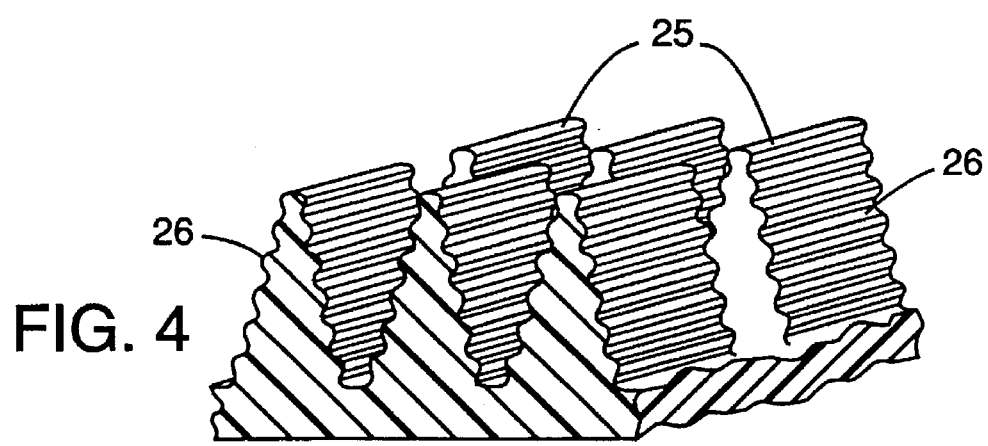
FIG. 4 shows a cross-sectional view of a portion of an alternate embodiment of a fastener element of the present invention.
Figure 5:
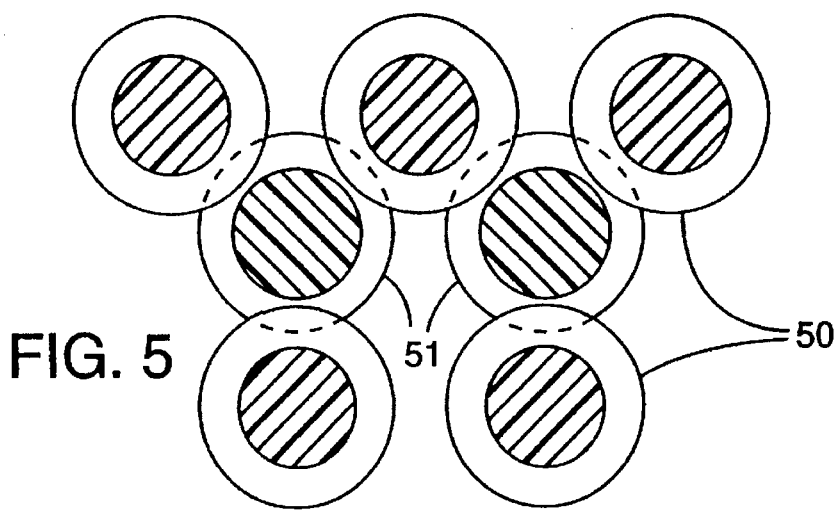
FIG. 5 shows a cross-sectional view of a portion of a fastener of the present invention. The cross-sectional view shows interlocking engaged mating elements from first and second fastener elements.

The size and positioning of the mating elements projecting from a polymeric film may be chosen such that a second polymeric film having similar features (the "complementary fastener element") is capable of being brought into interlocking engagement. The mating elements are typically oriented such that adjacent mating elements on the fastener element define a mating cavity which is capable of interlockingly engaging a mating element projecting from a second fastener element. This may be achieved by a fastener element which has a randomly arrayed set of projecting mating elements. More typically, however, the present fastener elements include some form of regularly arrayed mating elements. For example, the mating elements may include a regular array of parallel ridges 20 of the type shown in FIG. 3. Alternatively, the present mating elements may include a regular array of discontinuous mating elements, e.g., a square array of tapered posts 25 (as shown in FIG. 4) or a hexagonal array of rod-like posts 50 (as shown in FIG. 5).

The fastener elements may be self-mating, i.e., a fastener element may be capable of interlockingly engaging a second fastener element having an identical or substantially similar structure. It is not necessary, however, that the fasteners of the present invention consist of two substantially similar fastener elements. Rather, the present fasteners are only required to include a first fastener element having a mating cavity which is capable of interlockingly retaining a mating element projecting from a second fastener element. For example, the present invention includes fasteners in which the first fastener element has a parallel array of ridge-like elements having a plurality of microscopic ridges projecting from their sides and the second fastener element has an appropriately spaced square array of truncated polygon-shaped elements (e.g., truncated square pyramids).

As noted above, the mating cavities on the first fastener element are typically defined by adjacent mating elements projecting from the first fastener element. The portions of the outer surfaces of the projecting elements defining a mating cavity which come into contact with a second fastener element are referred to as "mating surfaces." Correspondingly, the surfaces of the mating elements projecting from the second fastener element which come into contact with the first fastener element also serve as "mating surfaces."

The shape and orientation of the mating elements on the first fastener element are not necessarily the same as the shape and orientation of the mating elements on the second fastener element. For example, the first fastener element may include ridge-like mating elements 20 having a plurality of microscopic ridges 21 projecting from their sides (see e.g., FIG. 3). The mating elements 20 of such a fastener element define a plurality of grooved mating cavities 22. In one embodiment of the present invention, a fastener may include two such grooved fastener elements. Alternatively, the present fastener may include one such grooved fastener element and a second ("complementary") fastener element which has a different configuration. For example, the second fastener element may include a plurality of discontinuous tapered posts 25 ("mating elements") which have a plurality of ridge-like microprotrusions 26 projecting from at least one sidewall (see e.g., FIG. 4). The spacing and orientation of the tapered posts on the second fastener element need not be such that the posts are capable of interlockingly engaging every ridged groove ("mating cavity") on the first fastener element. Rather, the size and orientation of the tapered posts on the second fastener element need only be such that a sufficient number of posts interact with the corresponding ridged grooves on the first fastener element to achieve interlocking engagement of the two fastener elements. For example, a fastener element of the type shown in FIG. 4 may have tapered posts 25 oriented such that the posts are only capable of being interlockingly engaged in every second, third or fourth groove-like mating cavity 22 of a fastener element of the type shown in FIG. 3. Similarly, the height of the mating elements on the first and second fastener elements of the present fasteners need not be identical so long as a sufficient number of mating elements on the two fastener elements are capable of being interlockingly engaged in order to hold the two fastener elements together.

The present fastener elements typically may be brought into interlocking engagement at least once without the microprotrusions on either the fastener element or the complementary fastener being destroyed or having their shape substantially altered. Preferably, the microprotrusions are capable of being subjected to a number of engagement-disengagement cycles without being destroyed or substantially degraded. The number of cycles that a particular fastener will be capable of withstanding without the microprotrusions suffering substantial degradation will depend on the intended use for the fastener. For some applications, it is sufficient if the mating elements can survive being brought into interlocking engagement a single time. If the fastener elements are intended to be employed as a closure element on an article of clothing, the fastener elements are preferably sufficiently durable to be able to withstand hundreds or even thousands of engagement-disengagement cycles. Other applications may require fastener elements which are capable of being subjected to 5, 10 or 25 engagement-disengagement cycles.

The microprotrusions on the mating surfaces of the present fastener elements may have a wide variety of shapes and may be arranged in a random and/or ordered array. The microprotrusions may be discontinuous, i.e., may consist of a plurality of discrete microscopic projections extending from the mating surfaces. For example, the microprotrusions may include a plurality of discrete mounds, posts, cones, pyramids, cylinders, partial spheres or spheroids, truncated cones ("fructoconical"), truncated pyramids, and/or other fructopolygonal shapes. In one embodiment of the invention, the microprotrusions include a plurality of small, random microprotrusions which are inverted replicas of the cells in the surface of a closed cell polymeric foam. Alternatively, the microprotrusions may be continuous in nature, e.g., a plurality of ridges or a single continuous ridge extending from the sides of a mating element in a screw thread configuration.

The dimensions of the microprotrusions are typically small enough to leave the overall form of the mating elements substantially unaltered. For example, continuous microprotrusions typically have a maximum height or width of no more than about 400 µm. Similarly, discontinuous microprotrusions typically have a maximum height of no more than about 400 µm and a maximum width of no more than about 400 µm. Preferably, discontinuous microprotrusions have a maximum height of no more than about 250 µm and a maximum width of no more than about 250 µm. Continuous microprotrusions preferably have a maximum dimension of no more than about 250 µm. The discontinuous microprotrusions typically have a minimum height and width of at least about 10 µm and preferably at least about 25 µm. Similarly, where the microprotrusions are continuous in nature, the height and width of the microprotrusions are typically at least about 10 µm and preferably at least about 25 µm.

Figure 6:
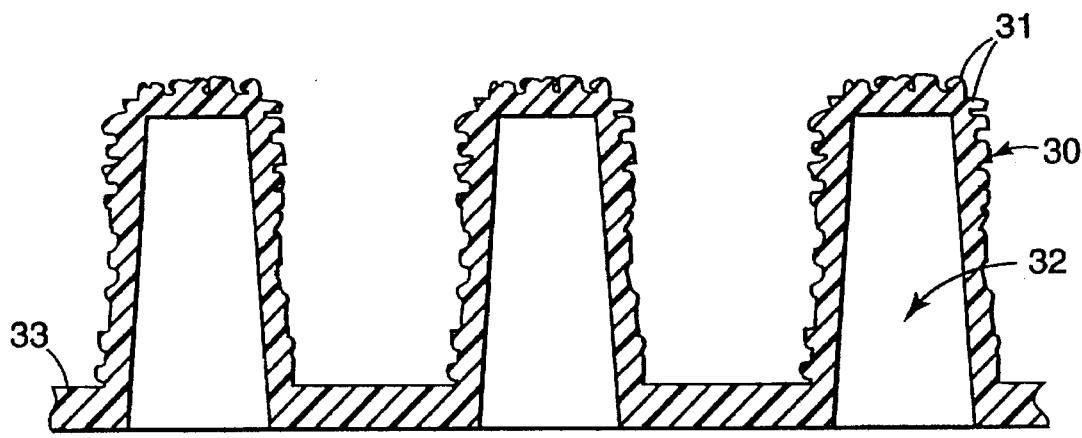
FIG. 6 shows a cross-sectional view of a portion of an alternate embodiment of a fastener element of the present invention which includes hollow posts.

The present fastener elements may be produced by a variety of methods. For example, a fastener element of the type shown in FIG. 6 may be formed by embossing a softened thermoplastic polymeric film in a manner that results in an array of hollow mating elements 30 projecting from one surface of the film 33 and simultaneously generating a plurality of microprotrusions 31 extending from the outer surface of the mating elements. This may be accomplished by passing the thermoplastic film through a nip which includes an embossing roll and a chill roll covered by a layer of resilient material. The resilient material is typically a foam material, e.g., a closed cell polymeric foam (such as LS1525 polyurethane foam; available from EAR™ Specialty Composites Corporation, Indianapolis, Ind.). The exposed cells at the surface of the closed cell foam act as microscopic molds for the formation of microprotrusions on the thermoplastic film.

When the softened thermoplastic polymeric film passes through the nip and contacts the embossing and chill rolls, hollow mating elements 30 projecting from the polymeric film are formed. As this occurs, the softened thermoplastic polymeric film is also thrust into intimate contact with the foam surface of resilient roll by the pressure in the nip. This forces the softened polymeric material to conform to the contours of the foam. The softened polymer is driven into any recesses, pores or crevices defined by the microscopic cells present on the foam surface, thereby generating microscopic protrusions 31 ("microprotrusions") on the polymeric surface in contact with the resilient surface. The microprotrusions formed on the polymeric surface are typically inverted replicas of corresponding microscopic cells. Contact between the foam surface and the polymeric material is maintained for sufficient time to allow the polymer to solidify to a sufficient degree such that the microprotrusions retain their shape as the microstructured polymeric film is pulled away from the resilient surface. This may be accomplished, for example, by maintaining the temperature of the chill roll below the softening point of the thermoplastic polymeric material. The overall result is the formation of microprotrusions on the portions of the polymeric material in contact with the foam. The resulting polymeric film 33 has a plurality of projecting hollow mating elements 30 having a hollow core 32 (see e.g., FIG. 6). The outer surface of the mating elements 30 includes a plurality of the microprotrusions 31.

Where a foam material is employed as the chill roll cover, a substantial number of the microprotrusions generated may be undercut-shaped. As used herein, the term "undercut-shaped" is defined as a shape having a cross-sectional surface area which increases and then typically decreases along a perpendicular vector away from the polymer surface. The cross-sectional surface area is measured in a plane perpendicular to the surface with respect to which the undercut-shaped microprotrusions in question are positioned. Because of the manner in which such undercut-shaped microprotrusions are formed, the microprotrusions are substantially inverted replicas of the cells in the foam surface of the chill roll cover.

In another embodiment of the invention, a unitary polymeric fastener element which includes solid, mating elements projecting from a sheet of polymeric material (see e.g., FIG. 1) may be formed by pressing a flowable polymeric material into a resilient mold (e.g., a silicone rubber mold). The resilient mold typically has a plurality of macroscopic depressions which include microdepressions extending from their sides into the mold. While the polymeric material is in intimate contact with the mold, it is solidified to a sufficient degree to allow the polymeric material to retain its shape as the polymer is pulled out of the mold. The resulting fastener element has a plurality of solid mating elements projecting from the element. At least one outer surface of the mating elements includes a plurality of microprotrusions which are inverted replicas of the microdepressions in the mold.

In a preferred embodiment of the invention, a resilient mold of the type described above may be mounted as the cover on the chill roll of a nip. Extrusion of a flowable polymeric material, such as a softened thermoplastic polymer, into the nip results in the formation of a polymeric film having solid microstructured projecting mating elements which are inverted replicas of the depressions in the resilient mold.

A wide variety of polymers may be used to produce the fastener elements of the present invention. Typically the polymeric material is thermoplastic although other polymeric materials capable of being processed in a flowable state, such as a plastisol or a B-staged thermoset polymer, may also be readily employed. The material the mating elements are formed from as well as the shape of the microprotrusions and mating element sidewalls, influences the agressiveness with which a fastener engages. Depending on the fastener design and the nature of the disengagement forces it is subjected to, the fastener may optimally be formed from either a high durometer or low durometer (e.g., circa 50 durometer) polymeric material. For example, a fastener including fastener elements having longitudinal grooved ribs which is subjected to a lateral shear force is preferably formed from a relatively high durometer polymeric material (e.g., about 90–100 durometer).

Suitable polymeric materials used to form the present fastener elements can be formed into mating elements having microprotrusions which are capable of substantially maintaining their structural integrity when subjected to the shearing forces generated when two of the present fastener elements are interlockingly engaged. The polymeric materials must be sufficiently durable to maintain the structural integrity of the microprotrusions through the number of engagement-disengagement cycles required by the intended use of the fastener. Some applications merely require a fastener having mating elements and microprotrusions capable of substantially sustaining their structure through a single engagement of the fastener elements. Other uses require fastener elements durable enough to withstand a large number of engagement-disengagement cycles without structural failure.

In addition to being sufficiently durable, the microprotrusions and/or mating elements on at least one of the fastener elements must be capable of sufficiently deforming to allow the microprotrusions to be brought into interlocking engagement. The deformation that occurs during the engagement process is elastic or anelastic but not plastic. In other words, the microprotrusions and/or mating elements deform in a manner such that the structure is substantially maintained following the completion of the engagement and/or disengagement process.

Examples of suitable thermoplastic polymeric materials which may be employed to produce the present fastener elements include polyolefins such as polypropylene, polyethylene, and polypropylene/polyethylene copolymers. Blends of polypropylene and/or polyethylene, such as a high/low molecular weight polyethylene blend (e.g., Hostalloy™ 731; Hoechst Celanese, Somerville, N.J.), are also suitable for use in the present invention. Other suitable thermoplastic polymers include polyvinyl chloride (PVC), polyamides such as a nylon (e.g., nylon 6, nylon 6,6, or nylon 6,9), polystyrene, and polyesters. Olefin copolymers such as ethylene/vinyl acetate copolymers or copolymers of an olefin and an a,b-unsaturated acid (e.g., an ethylene/methacrylic acid copolymer reacted with metal salts to confer ionic character; available from E. I. du Pont de Nemours & Co., Inc. as Surlyn™ 8527) may also be employed in the present invention. Resilient polymeric materials such as a silicone rubber, thermoplastic elastomers (e.g., Kraton™), resilient polyurethanes, and plasticized PVC may also be used to form the fastener elements of the invention. In a preferred embodiment, the polymeric material includes a polyolefin.

The present fastener elements may also be formed from a thermoplastic polymer in the form of a plastisol. The plastisol includes a dispersion of thermoplastic resin particles (e.g., polyvinyl chloride resin particles) in a plasticizer and may also include a volatile organic solvent. Examples of suitable plastisols which may be used to produce the present fastener elements include vinyl plastisols such as #D1902-50 Black and #D1902-78 White available from Plast-O-Meric, Inc. (Waukesha, Wis.).

Depending on the structural features and the type of polymeric material employed, the deformation during engagement/disengagement may occur in one of a number of modes. At one extreme, all of the deformation that occurs as fastener elements are brought into engagement is localized entirely within the microprotrusions while the body of the mating elements remains largely undistorted. This may occur where the microprotrusions are formed from a sufficiently resilient material. The deformation may also be almost totally confined to the microprotrusions where solid mating elements are formed from a rigid polymeric material. In this case, the dimensions of the microprotrusions permit them to be flexed in a manner akin to that of a leaf spring. Alternatively, the microprotrusions may be of a material and dimensions such that the microprotrusions are essentially undeformed during engagement and the necessary flexibility is derived entirely from the ability of the mating element bodies to deform. This can occur where the mating elements consist of hollow projections formed by embossing a thin film of rigid polymeric material. The hollow inner portion of the embossed fastener element may be at least partially filled with a resilient material. This allows the body of the mating element to flex even if the microprotrusions remain substantially undeformed during engagement of the fastener element. In many instances, however, both the microprotrusions and the body of the mating element are deformed to some degree as the fastener element is engaged.

Fastener elements which permit a requisite degree of deformation may have one of a number of related structures. For example, the mating elements may include hollow structures projecting from the surface of the fastener element. Where the fastener elements are formed as a unitary polymeric structure and include solid mating elements, rigid polymeric materials such as polyethylene, polypropylene or copolymers which include ethylene or propylene may be employed. Other suitable polymeric materials which may be employed to make unitary fastener elements having solid mating elements include polyamides, polyesters, PVC, polystyrenes, and polycarbonates. The polymeric materials used to form solid mating elements are sufficiently rigid to provide structural integrity to the mating elements. The polymeric material must, however, not be so brittle that the microprotrusions are sheared off when two fastener elements are brought into interlocking engagement.

Figure 7:
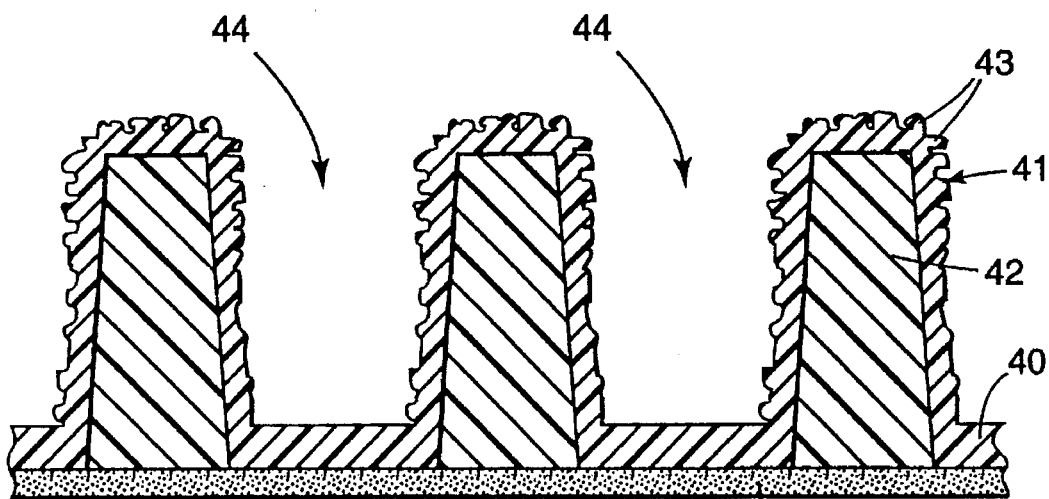
FIG. 7 shows a cross-sectional view of a portion of an alternate embodiment of a fastener element of the present invention which includes hollow posts having the recesses filled with a polymeric material.

The present fastener elements need not have a unitary polymeric structure. Rather, the fastener elements of the present invention may be formed from a male-female embossed polymer film having microprotrusions on the male surface of the embossed film. The film 40 may be embossed to create a plurality of hollow projecting mating elements 41 (see e.g., FIG. 7). The hollow cores of the mating elements 41 may be filled with a polymeric material 42 to strengthen and support the mating elements 41 and alter their flexibility and resiliency. The overall resiliency of the mating elements on at least one fastener element of a fastener must allow the outer contour defined by microprotrusions 43 to deform sufficiently without be destroyed to enable a complementary mating element to be pressed into mating cavity 44 such that microprotrusions on the mating surfaces in contact are interlockingly engaged. Typically, mating elements on both fastener elements of a fastener are resilient and deform elastically or anelastically during engagement. In order to be achieve interlocking engagement, however, only the outer contour defined by the microprotrusions of one fastener element a pair need be capable of elastic or anelastic deformation. For example, the present invention includes fasteners where one fastener element includes mating elements with microprotrusions formed from a resilient polymeric material while the microprotrusions on the mating elements of the complementary fastener element are formed from a rigid polymeric material.

The properties of the present fastener elements can be tailored by appropriate selection of the polymer used to form the hollow mating elements and the polymer used to fill the hollow elements. For example, the hollow mating element 41 and the microprotrusions thereon 43 may be formed from a relatively rigid polymeric material such as a polyolefin, an olefin copolymer, a polyamide, a polyester, PVC, a polystyrene, or a polycarbonate. Thermoset polymeric materials such as an epoxy may also be employed as the relatively rigid material. Fastener elements of this type typically include a relatively resilient polymer, such as a silicone rubber or a thermoplastic elastomer, at least partially filling the cores of the mating elements. The presence of the resilient material 42 in the core allows such mating elements to deform sufficiently to be placed in interlocking engagement with a second fastener element, while the rigid polymer which makes up the hollow outer shell confers structural integrity and durability on the mating elements.

In another embodiment of the invention, the fastener elements may include hollow mating elements formed from a relatively resilient polymeric material, such as a silicone rubber, a resilient polyurethane, a plasticized PVC or a thermoplastic elastomer. Fastener elements of this type may have a hollow core which is filled with a relatively rigid polymeric material. To produce fastener elements of this type the hollow mating elements and the microprotrusions thereon are formed from a resilient polymer having sufficient structural integrity to allow the mating elements to withstand the desired number of engagement-disengagement cycles. Polyolefins and epoxies are examples of polymeric materials having the requisite rigidity to be employed as filler in the hollow core of the fastener elements.

Figure 8:
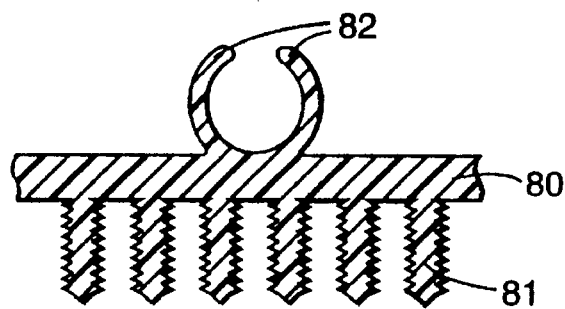
FIG. 8 shows a cross-sectional view of a portion of an alternate embodiment of a fastener element of the present invention which includes a plurality of dual structured mating elements on one face and a "slotted cup" fastener component on the opposite face.
Figure 9:
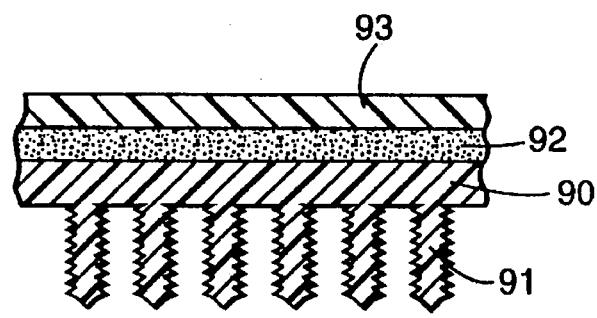
FIG. 9 shows a cross-sectional view of a portion of an alternate embodiment of a fastener element of the present invention which includes a plurality of dual structured mating elements on one face and an adhesive layer covered by a release liner on the opposite face.

The present fastener elements may optionally include an additional attachment component on a face other than the surface which includes the dual structured mating elements. The attachment component permits the fastener element to be affixed to an article such as a wall, a diaper, a piece of sheet metal, a bulletin board, a container or an article of clothing. The attachment component may include a mechanical fastener element, e.g., a "slotted cup" attachment component 82 of the type shown in FIG. 8. The fastener element illustrated in FIG. 8 includes a plurality of threaded posts 81 on one side and two "slotted cup" projections 82 on the opposite side. Alternatively, a fastener element may have an attachment component which includes a layer of adhesive. For example, the fastener element may have a plurality of threaded posts on one face and a layer of adhesive on the opposite face (see e.g., FIGS. 7 and 9). The adhesive backing layer 45, 92 on the fastener elements depicted in FIGS. 7 and 9 allows the fastener element to be affixed to another object. For storage purposes, adhesive backed fastener elements are typically produced with a removable liner 93 covering the adhesive layer (see, FIG. 9). Fastener elements of this type may be employed as a tape substitute, a diaper closure or the like.

Figure 10:
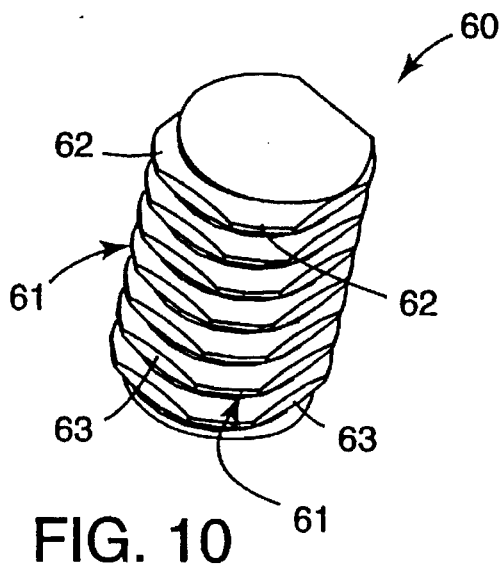
FIG. 10 shows a perspective view of a mating element of an alternate embodiment of the present invention.
Figure 11:
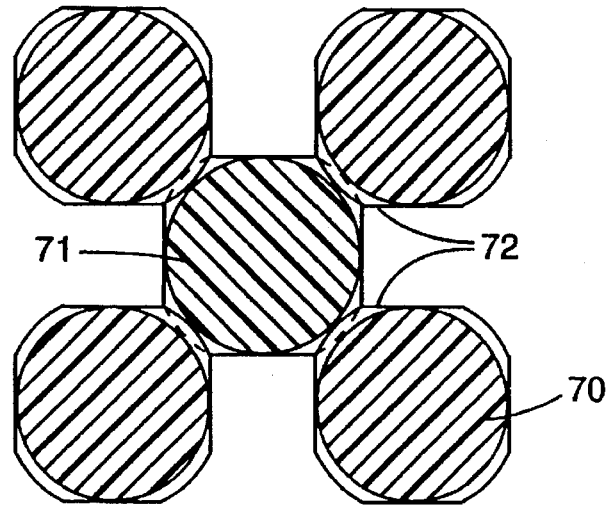
FIG. 11 shows a top view of a portion of an alternate embodiment of a fastener element of the present invention which includes mating elements of the type depicted in FIG. 10.
Figure 12:
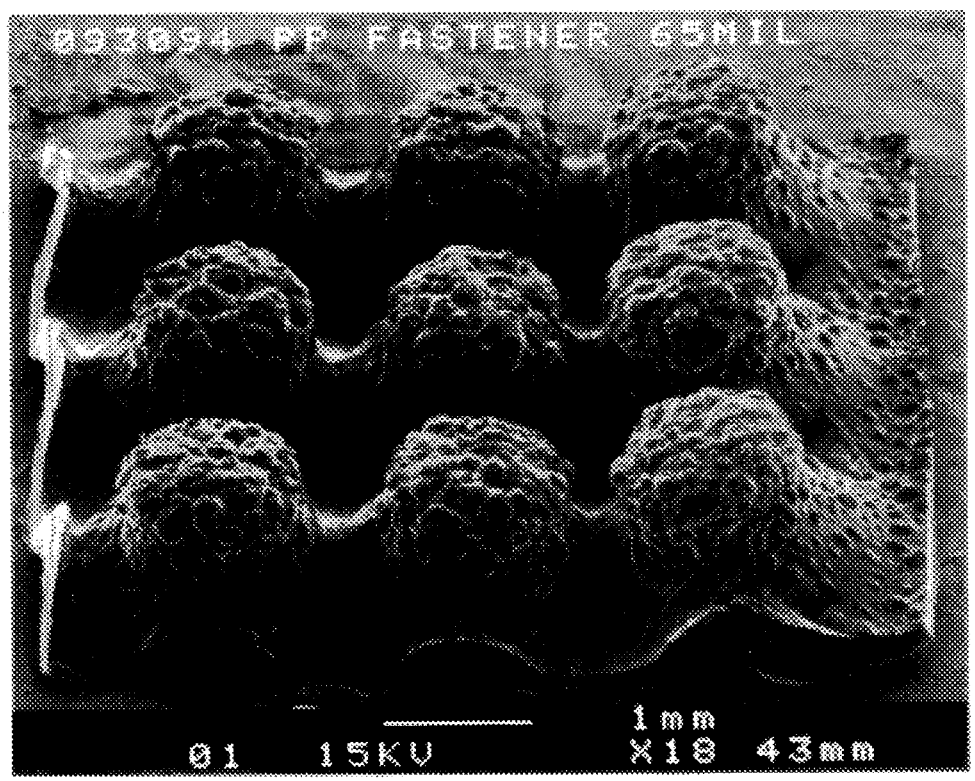
FIG. 12 is an electron micrograph (18× magnification) of a portion of a fastener element of an alternate embodiment of the invention which includes a square array of cylindrical posts.
Figure 13:
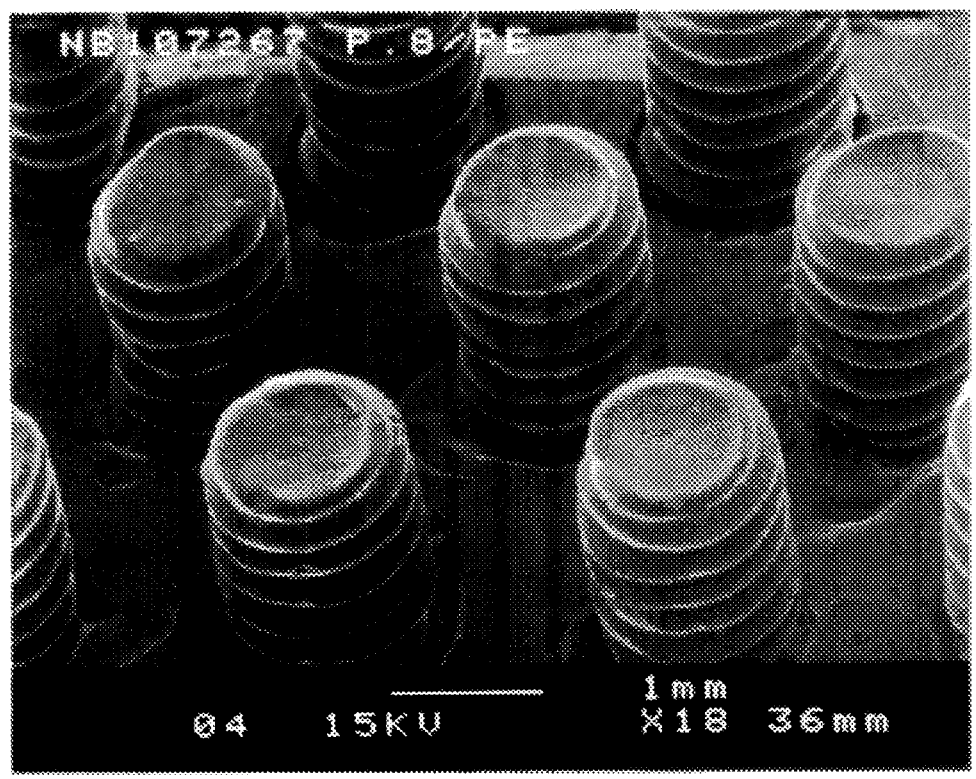
FIG. 13 is an electron micrograph (18× magnification) of a portion of a fastener element of an alternate embodiment of the invention which includes a hexagonal array of screw threaded posts.

While the outer surface of the present mating elements may be entirely covered with microprotrusions, this is not a requirement. The microprotrusions need only be present on at least one surface of a mating element which comes into contact with a mating surface bearing microprotrusions on a second mating element when two fastener elements are engaged. For example, the mating element 60 illustrated in FIG. 10 only has microprotrusions 62 on the four mating surfaces 61 at its corners. The remaining surfaces 63 on the sides of mating element 60 need not have any microstructure and may even be optically smooth. A fastener element may be formed from a polymeric substrate having a plurality of such mating elements 70 oriented in a square array (see e.g., FIG. 11). The mating elements 70 need only have microprotrusions on one or more of the surfaces 72 which face the mating cavity defined by four adjacent mating elements 70. When a mating element 71 from a second fastener element is pressed into the mating cavity, the interaction between the microprotrusions on the two sets of mating surfaces is sufficient to interlockingly engage the two fastener elements.

The invention is further characterized by the following examples. These examples are not meant to limit the scope of the invention as set forth in the foregoing description. Variations within the concepts of the invention will be apparent to those skilled in the art.

EXAMPLE 1

The dual structured fastener element of this example was prepared starting from a master (which had the configuration of the fastener element). A resilient mold was then made of the master and the fastener element was formed from the resilient mold.

The master was produced from a flat plate tapped with holes for an 0–80 UNF series designation screw (outside thread diameter of 1.5 mm and inside diameter of 1.3 mm). The holes were placed in a hexagonal array with hole to hole spacing of 2.4 mm and row to row spacing of 2.1 mm. The 0–80 screws were threaded into the plate so that approximately 6 threads showed on the non-head side (i.e., threaded posts about 2.1 mm in height projected from the flat plate).

A patterned silicone rubber mold was then prepared of the above master by applying an approximately 5 mm thick coating of uncured silicone rubber (Silastic™ brand J-RTV silicone rubber; available from Dow Corning Corporation, Midland, Mich.) over the surface containing the threaded posts. The rubber was cured at 67° C. for one hour and then removed from the master to provide a resilient mold. The mold had a hexagonal pattern of threaded depressions which were inverted replicas of the threaded posts projecting from the surface of the master. The depressions were about 2.1 mm deep with threaded grooves (circa 0.2 mm deep) on the sides of the depressions.

The rubber mold was placed on a hot plate at 216° C. and several layers of 152 µm thick polyethylene film (formed from DOWEX™ 2047A; available from Dow Chemical Company, Midland, Mich.) were placed on top of the mold. A layer of 38 µm thick Kapton™ film (polyimide film available from E. I. dupont de Nemours and Company Incorporated, Wilmington, Del.) was placed on top of the polyethylene. The polyethylene was allow to melt (5 to 10 minutes) and then pressed into the depressions in the mold. After the polyethylene had cooled to a sufficient degree to allow the threaded posts to retain their shape, the polyethylene fastener element was removed from the mold and the Kapton™ film was removed. The resulting fastener element was a polyethylene film having 2.1 mm high threaded posts projecting from one major face of the film (see FIG. 1). The threads extended about 0.2 mm out from the sides of the posts. If the faces containing the threaded posts of two such polyethylene fastener elements were pressed together, the fastener elements formed a self-mating fastener.

EXAMPLE 2

A fastener element having a dual structured portion (hexagonal array of threaded posts) on one major face was made in a manner substantially identical to that described in Example 1, except that after the polyethylene was pressed into the depressions in the resilient mold, the Kapton™ layer was removed and the polyethylene was left on the hot plate in a molten state to form "Segment A" of a fastener.

A fastener component having a "slotted cup" configuration was formed on the opposite face of the fastener element according to the following procedure. This mechanical fastener consisted of two "slotted cup" projections designed to lock into two 8 mm diameter holes. A silicone rubber master mold was formed from two "slotted cup" projections (#SJ3747, 3M, St. Paul, Minn.) according to the procedure described in Example 1 except that an approximately 7.5 mm thick coating of uncured silicone rubber was applied to the two "slotted cup" projections.

The "slotted cup" master mold was placed on a hot plate at 216° C., several layers of 152 µm thick polyethylene film (as per Example 1) were placed on top of the mold and a layer of 38 µm thick Kapton™ film was placed on top of the polyethylene. The polyethylene was allowed to melt (5 to 10 minutes) and then pressed into the holes in the mold and the Kapton™ film was removed from the top of the polyethylene to form "Segment B" of a fastener.

Segments A and B were then joined such that the unmolded faces of the two polyethylene layers were allowed to bond in a molten state. The two segments were maintained in contact while in a molten state for 5 to 10 minutes and then the entire polymeric assembly was moved off the hot plate and allowed to cool. The polyethylene fastener element was removed from the silicone rubber molds as a unitary polymeric assembly having a plurality of threaded mating elements projecting from one side and a "slotted cup" fastener projecting from the opposite side (see FIG. 8). The polymeric assembly was capable of being mechanically fastened on either or both sides.

EXAMPLE 3

A self mating fastener element was made by passing molten polypropylene (formed from DS7C50; available from Shell Chemical Co., Houston, Tex.) through a nip where the polypropylene was pressed between a metal tool and a chill roll covered with two 3.2 mm thick sheets of a closed-cell polyurethane foam (see description below). The metal tool had a hexagonal close packed array of projecting circular posts (1.0 mm in diameter, 1.0 mm in height) which were spaced 1.8 mm on center. This produced a male-female embossed polypropylene film having large hollow posts (1 mm in height, 1 mm in average diameter) projecting from one face of the film ("male mating surface") in a hexagonal array (1.8 mm on centers). The male surface of the embossed polypropylene film had a secondary structure consisting of small, random microprotrusions, which were inverted replicas of the cells in the surface of the foam sheet.

The polyurethane foam used as the chill roll cover was prepared as generally described in U.S. Pat. Nos. 3,772,224 (Marlin et. al.) and 3,849,156 (Marlin et. al), the disclosures of which are incorporated herein by reference. The foam was prepared from a four component mixture (A–D), the composition of which were as follows:

Part A—100 parts of a polyol mixture consisting of Niax 24–32 (97.77 parts) and Niax E-434 (2.23 parts), polyether polyols (available from Arco Chemical Co., Newton Square, Pa.) dipropylene glycol (9.18 parts per hundred parts (php) polyol; fragrance grade), Niax LC-5615 (3.74 php, a nickel catalyst composition available from OSI Specialities, Lisle Ill.), aluminum trihydrate filler (54.59 php, Aloca C-331, available from Aluminum Company of America, Bauxite, Ariz.), and Hostaflam AP 442 flame retardant (16.38 php, available from Hoechst Celanese Corp., Charlotte, N.C.);

Part B—37.39 php of an isocyanate mixture consisting of 4,4'-diphenylmethane diisocyanate and a modified 4,4'-diphenylmethane diisocyanate (Rubinate 1920 available from ICI, Rubicon Chemicals, Geismer, La.);

Part C—4.77 php of a 70.9% (w/w) solution of a silicone surfactant (L-5614, available from OSI Specialities) in a polyether glycol (Niax E-351, available from Arco Chemical Co.); and Part D—6.71 php of an approximately 8% solids (w/w) dispersion of carbon black (Product No. 1607029, available from Spectrum Colors, Minneapolis, Minn.) in polyether glycol (Niax E-351).

Separate feed streams of the four components were pumped into a 90 mm dual head Oakes Frother (available from ET Oakes Corp., Hauppauge, N.Y.) through an entrance manifold attached to the frother. The mixture was frothed by injecting high purity nitrogen through a capillary tube located at the entrance to the frother. The frothed mixture was processed through the frother at a mixing speed of 800 rpm and a discharge pressure of about 0.55 MPa and dispensed from an approximately 2.6 m×1.3 cm hose onto a polyester film and spread over the film using a knife coater (2.4 mm gap). The foam was cured by passage through a 3 chambered 13.7 m forced air oven at a line speed of 1.5–1.8 m/minute. The first chamber was maintained at 135° C. The second and third chambers were maintained at 154° C.

When the embossed polypropylene film was folded back onto itself such that two portions of the male mating surface were brought into contact, the projecting elements interlockingly engaged. After a number of engagement-disengagement cycles, the fastener element would no longer lockingly engage with itself. Examination of the male surface of the film under an optical microscope revealed that the small protrusions on the sides of the posts had been flattened. This suggests that the interactions of the secondary structure (small, random protrusions) are necessary in order for the interlocking engagement of the posts.

EXAMPLE 4

The embossed polypropylene film of Example 3 was coated on the female side with a silicone rubber (Silastic™ brand E-RTV silicone rubber; available from Dow Corning Corporation, Midland, Mich.) such that only the recesses in the female side of the posts were filled with silicone rubber. The initial engagement-disengagement forces required with the silicone rubber-filled fastener element appeared to be higher than those for the fastener element of Example 3. However, after a number of cycles the small protrusions on the sides of the posts flattened, as with the fastener element described in Example 3, and the fastener element ceased to interlockingly engage with itself.

EXAMPLE 5

A self-mating fastener element was made by coating the patterned silicone rubber mold of Example 1 with a mixture of Kraton™ G1652 (available from Shell Chemical Co., Houston, Tex.) and toluene at 33% solids. As the toluene evaporated, a continuous Kraton™ film covering the threads and the land area between the threaded depressions was formed. The resulting resilient Kraton™ film was a replica of the mold and had a hexagonal pattern of 2.1 mm high hollow, threaded posts. The hollow posts were filled with an epoxy resin (a 5:1 mixture of Epo-Kwik™ Resin No. 20-8136-128 and Epo-Kwik™ Hardener No. 20-8138-032; available from Buehler, Lake Bluff, Ill.) which was allowed to harden. When the faces containing the threaded posts of two such fastener elements were pressed together, the fastener elements interlockingly engaged. The engaged fastener elements were disengaged and reengaged a number of times demonstrating the fastener elements having resilient hollow posts filled with a rigid material can form a releasably engageable self-mating fastener.

EXAMPLE 6

A fastener element having a square array of microstructured posts on one major face was made in a manner substantially identical to that described in Example 1, except that a different master was used to form the rubber mold. As in Example 1, the master was produced from a flat plate tapped with holes for 0–80 UNF series designation screws placed in a square lattice array with hole to hole spacing of 2.0 mm. The 0–80 screws were threaded into the plate so that approximately 6 threads showed on the non-head side (i.e., threaded posts about 2.2 mm in height projected from the flat plate).

Figure 17:
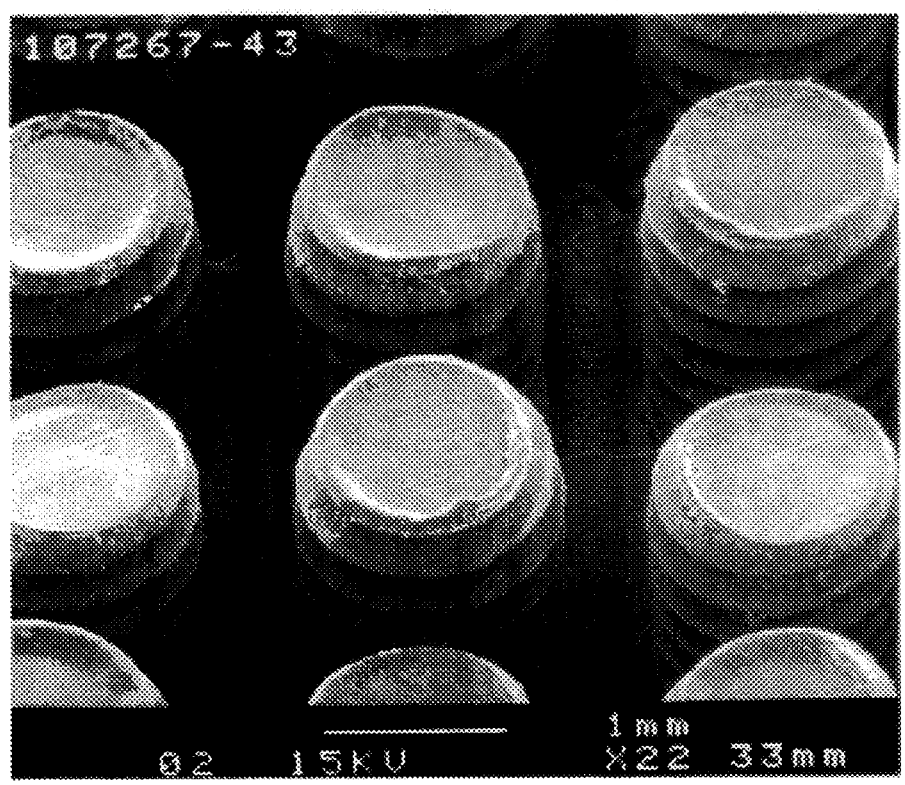
FIG. 17 is an electron micrograph (22× magnification) of a portion of a fastener element of an alternate embodiment of the present invention which includes a square array of screw-threaded posts.

A silicone rubber mold was prepared from this master and a polyethylene fastener element was produced from the mold according to the procedure described in Example 1. The resulting fastener element was a polyethylene film having a square array of 2.2 mm high threaded posts projecting from one major face of the film (see FIG. 17). The threads extended about 0.2 mm out from the sides of the posts. When the faces containing the threaded posts of two such polyethylene fastener element were pressed together, the fastener elements formed a self-mating fastener.

EXAMPLE 7

A fastener element having a square array of microstructured posts on one major face was made in a manner substantially identical to that described in Example 1, except that a different master was used to form the rubber mold. The master was made by machining the master used in Example 6 such that each screw 60 had four flat faces 63 uniformly disposed around the circumference of the screw (see FIG. 10). The flat faces were separated by portions of the screw sidewalls 61 which still retained the threads 62.

Figure 18:
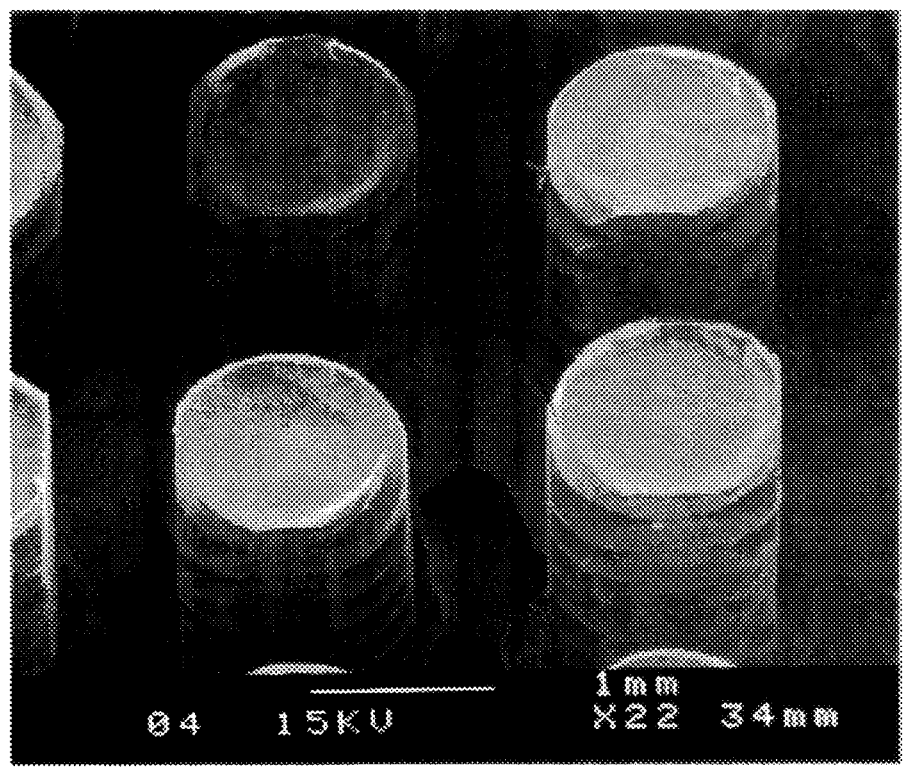
FIG. 18 is an electron micrograph (22× magnification) of a portion of a fastener element of an alternate embodiment of the present invention which includes a square array of screw-threaded posts having four flat faces uniformly uniformly disposed around the circumference of each post.

A silicone rubber mold was prepared from this master and a polyethylene fastener element produced from the mold according to the procedure described in Example 1. The resulting fastener element was a polyethylene film having a square array of 2.2 mm high threaded posts projecting from one major face of the film (see FIGS. 11 and 18). The posts had six ridges protruding about 0.2 mm on the post sidewalls 72 directed at the center of the mating cavity (see FIG. 11). The mating cavity is defined by four adjacent posts 70 in the square array. When two such polyethylene fastener elements were pressed together, the fastener elements formed a self-mating fastener. The projecting posts on the two fastener elements were disposed so that the threads projecting from sidewalls of the corner of the posts were interlockingly engaged (see FIG. 11).

EXAMPLE 8

A fastener element prepared according to the procedure described in Example 6 was treated with a primer and coated with an adhesive on the flat side of the polyethylene film (the side opposite the mating elements). The flat side of the fastener element was primed with a acrylic based polyolefin primer (available as product number 4298 from 3M, St. Paul, Minn.) using a small brush. After the primer was allowed to air dry for 20 minutes, a 0.25 mm acrylic pressure sensitive transfer adhesive carried on a removable liner (F9473PC, available from 3M, St. Paul, Minn.) was laminated onto the primed side of the fastener element with a 2.4 kg hard, rubber roll. After removal of the liner, the fastener element was adhesively laminated to an aluminum plate. The adhesive backing thus allowed attachment of the self-mating fastener element to a substrate.

EXAMPLE 9

Another fastener element of the present invention was prepared by the following procedure.

Figure 14:
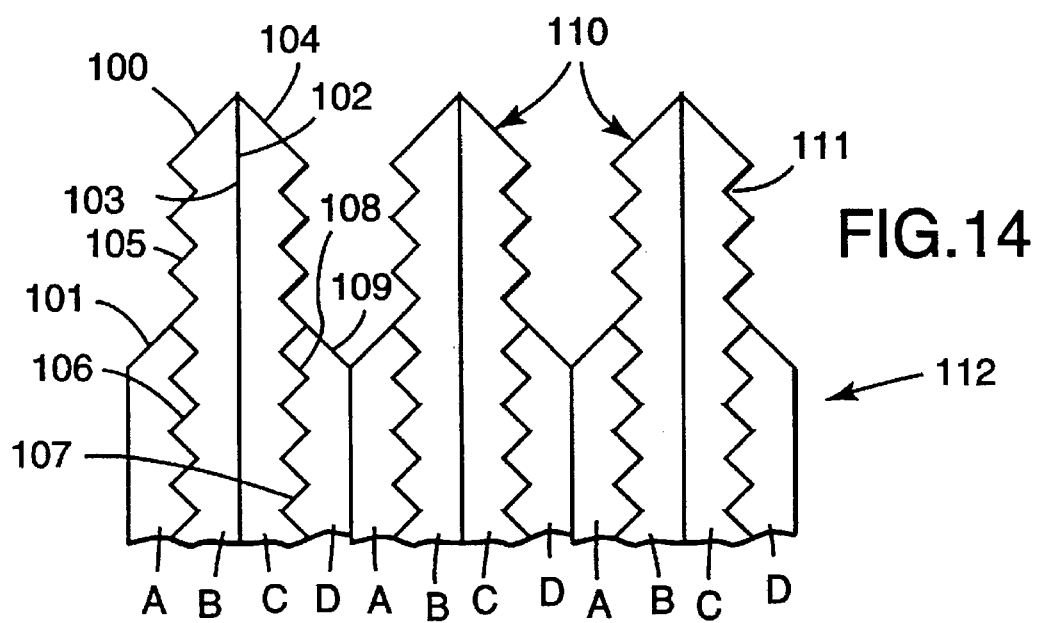
FIG. 14 depicts a cross sectional view of a portion of a master used to prepare a microstructured polymeric substrate of the present invention.

One end of a piece of 3MÔ Optical Lighting Film #2300 Acrylic (available from 3M, St. Paul, Minn.), approximately 90 cm×10 cm, was secured, grooved face down, to a bench top with masking tape. The 3MÔ Optical Lighting Film includes a plurality of substantially 90° included angle ridges. The depressions in the surface of the film are about 0.18 mm in depth. The unsecured end of the film was grasped in a manner such that a tear could be initiated in a grove approximately 2 cm from the edge of the film and the film torn along its length. The film was torn at an angle of between approximately 15°–30° from the horizontal to produce a clean, straight edge having a substantially constant acute angle along one piece of the film and a complementary obtuse angle on the edge of the corresponding piece of film. The strips produced in this manner were cut into approximately 6.5 cm lengths (herein after referred to as "master elements") and used to assemble a fastener master 112, a portion of the cross-section of which is illustrated in FIG. 14, in the following manner:

The grooved faces 105, 106 of two master elements (A, B) were nested together so that the acute tear angle edge 100 of one element (B in FIG. 14) extended beyond the obtuse tear angle edge 101 of the second element (A in FIG. 14) by four ridges. The smooth face 102 of a third master element (C in FIG. 14) was then placed against the smooth face 103 of the second master element (B) with the acute tear angle edges 100, 104 aligned. The grooved face 108 of a fourth master element (D in FIG. 14) was then nested with the grooved face 107 of the third master element (C) with the obtuse angle tear edge 109 being indexed four groves below the acute tear angle edge 104 of the third element (C) and aligned with the obtuse tear angle edge 101 of the first master element (A). The stacking pattern (ABCDABCD . . . ) was repeated until a fastener master 112, approximately 1.2 cm×6.5 cm was assembled. The total assembly was clamped together using a number of binder clips (⅝ inch capacity binder clip No. 100500 distributed by IDL Corp., Carlstadt, N.J.).

A master mold of the fastener master was prepared according to the following steps:

a) Forcing a vinyl siloxane dental impression material (3M ExpressÔ, available from 3M, St. Paul, Minn.) into the contoured edge of the fastener master with the manufacture's supplied application device, being careful to avoid entraining air bubbles between the impression material and the fastener master;

b) Containing a pool of the dental impression material on a glass plate between two aluminum spacer bars (approximately 0.32 cm×1.25 cm×2 cm) positioned approximately 2.5 cm apart;

c) Centering the fastener master over the spacer bars such that each end of the fastener master overlapped each spacer bar approximately 0.5 cm and forcing the impression filled face of the fastener master into the pool of impression material until the impression filled edge of the fastener master contacted the spacer bars;

d) Positioning two additional aluminum bars (approximately 0.6 cm×0.6 cm×10 cm) in the impression material pool such that they contacted the ends of the spacer bars, thereby forming a containment well for the impression material;

e) Allowing the impression material to cure;

f) Removing the fastener master from the cured impression material and trimming the ends of the cured mold to provide an approximately 2.5 cm long mold of the master; and g) Securing end dams to the thus trimmed mold to provide a well for subsequent fastener element molding.

Figure 15:
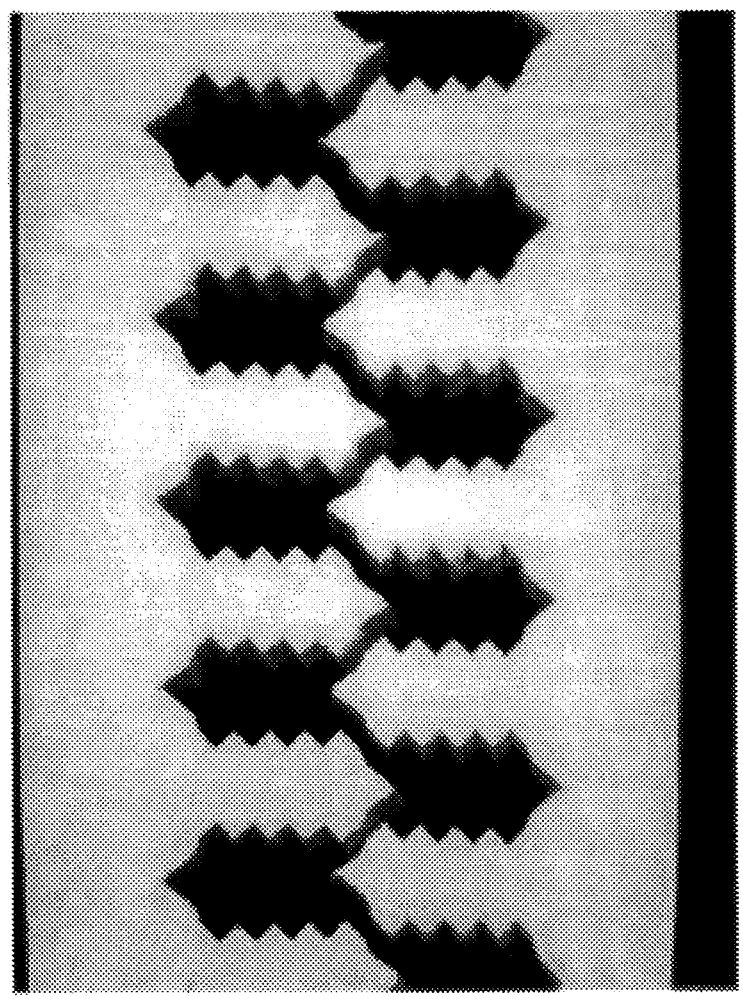
FIG. 15 is an electron micrograph of a cross-sectional view of portions of two fastener elements of the present invention prior to their being brought into engagement.
Figure 16:
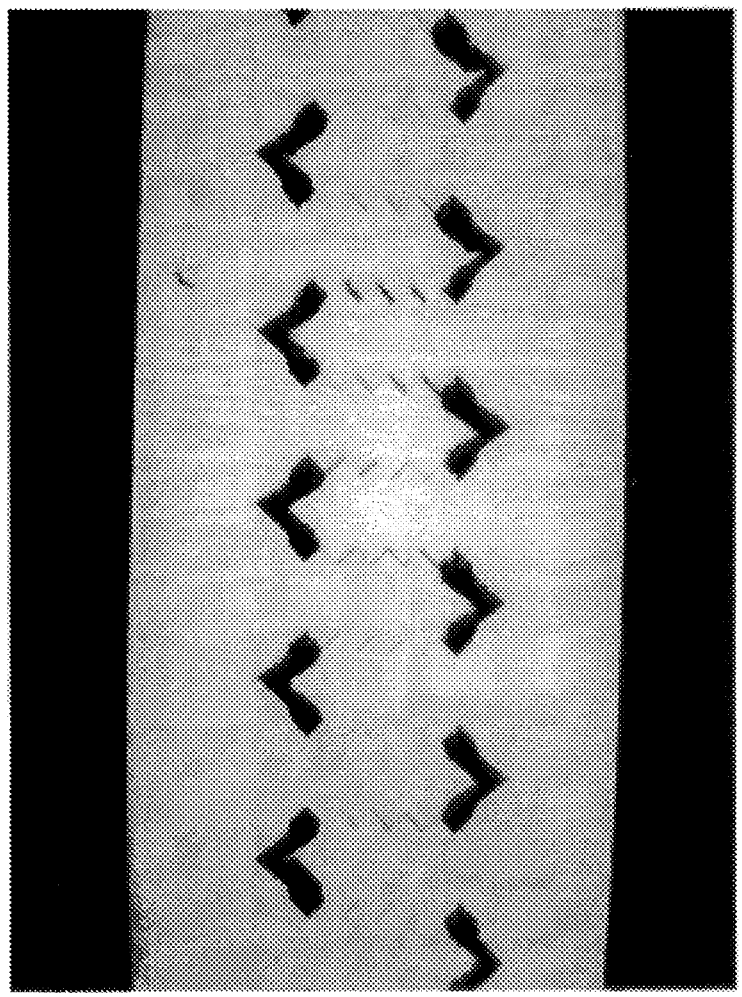
FIG. 16 is an electron micrograph of a cross-sectional view of portions of the two fastener elements of FIG. 15 in interlocking engagement.

Fastener elements were prepared by filing the master mold with a vinyl plastisol (#D1902-50 Black, available from Plast-O-Meric, Inc. Waukesha, Wis.) and curing the plastisol in a circulating air oven at 204° C. (400° F.) for 15 minutes. The cured plastisol was demolded to produce a flexible, compliant fastener element (50 durometer) having a plurality of grooved ridges which were replicas of the grooved ridges 110 of master 112 (and inverted replicas of the depressions in the master mold). Two such fastener elements were engaged with light finger pressure and could be readily disengaged by pealing one fastener element from the other. FIGS. 15 and 16 show a cross-section of the fastener elements just prior to engagement and in interlocking engagement, respectively. The fastener had a good holding force without being fully engaged. Much like a zipper, only a small force was needed to close the fastener if the closure process was begun at one end of the fastener and progressed to the other end. A large force was required to open the fastener if applied along its entire length.

EXAMPLE 10

A related set of fastener elements were prepared using the master mold of Example 9, substantially following the procedure of Example 9, except that a firmer vinyl plastisol (#D1902-78 White, available from Plast-O-Meric, Inc.) was used to form the fastener elements (78 durometer). The fastener elements were readily engaged and disengaged, with those described in Example 9.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The invention has been described with reference to various specific and preferred embodiments and techniques. However, it should be understood that many variations and modifications may be made while remaining within the spirit and scope of the invention.

What is claimed is:

1. A self-mating fastener element comprising:
    a polymeric substrate comprising a plurality of mating elements projecting therefrom, the mating elements each comprising a mating surface
    wherein a cross-section of each mating element through the mating surface comprises a plurality of microprotrusions extending therefrom, the microprotrusions having a height of no more than about 400 microns and a width of no more than about 400 microns;
    wherein the fastener element is capable of being self-matingly engaged such that the engaged fastener element is separable by a disengagement force directly proportional to the number of interlockingly engaged microprotrusions.

2. The fastener element of claim 1 wherein the mating elements comprise solid mating elements.

3. The fastener element of claim 1 wherein the mating elements comprise a thermoplastic polymer.

4. The fastener element of claim 1 comprising mating elements having an outer surface and a hollow core, wherein a portion of the outer surface comprises the microprotrusions.

5. The fastener element of claim 4 wherein the mating elements comprise a rigid polymeric material.

6. The fastener element of claim 5 wherein the hollow core is at least partially filled with a resilient material.

7. The fastener element of claim 4 wherein the mating elements comprise a resilient material.

8. The fastener element of claim 7 wherein the hollow core is at least partially filled with a rigid polymeric material.

9. The fastener element of claim 1 comprising the mating elements on a first major face and further comprising an attachment component on a second major face.

10. The fastener element of claim 9 wherein the attachment component comprises a mechanical fastener element.

11. The fastener element of claim 9 wherein the attachment component comprises an adhesive layer.

12. The fastener element of claim 1 wherein the mating elements comprise ridge-like mating elements and the microprotrusions comprise microscopic ridges projecting from the ridge-like mating elements.

13. An article comprising a surface and having the fastener element of claim 1 affixed to the surface.

14. A fastener comprising first and second fastener elements;
    the first fastener element comprising a first unitary polymeric substrate having a plurality of solid first mating elements projecting therefrom, the first mating elements each having a first mating surface wherein a cross-section perpendicular to the first mating surface comprises a plurality of first microprotrusions extending therefrom, and the first microprotrusions are capable of flexing in a leaf spring-like manner;
    the second fastener element comprising a second unitary polymeric substrate having a plurality of solid second mating elements projecting therefrom, the second mating elements each having a second mating surface wherein a cross-section perpendicular to the second mating surface comprises a plurality of second microprotrusions extending therefrom, and the second microprotrusions are capable of flexing in a leaf spring-like manner; and
    wherein the fastener elements are capable of being engaged by an engagement force such that at least one first mating element is retained by an interlocking interaction of the first and second mating surfaces in a mating cavity defined by adjacent second mating elements; and the engaged fastener elements are separable by a disengagement force directly proportional to the engagement force.

15. The fastener of claim 14 wherein the first microprotrusions comprise a plurality of microridges having a height of no more than about 400 microns and a width of no more than about 400 microns.

16. The fastener of claim 15 wherein the microridges are formed as a continuous a ridge having a screw thread configuration.

17. The fastener of claim 14 wherein first microprotrusions comprise discontinuous microridges having an interrupted screw thread configuration.

18. The fastener of claim 14 wherein the first mating surface has a draft of no more than about 10°.

19. The fastener of claim 14 wherein the first unitary polymeric substrate is formed from a polyolefin.

20. The fastener of claim 14 wherein the first and second fastener elements have substantially similar structures.

21. The fastener of claim 14 wherein the first mating elements are posts.

22. A fastener comprising first and second fastener elements;
    the first fastener element comprising a first unitary polymeric substrate having a plurality of solid first mating elements projecting therefrom, the first mating elements each having a first mating surface wherein a cross-section perpendicular to the first mating surface comprises a plurality of first microridges extending therefrom; and
    the second fastener element comprising a second unitary polymeric substrate having a plurality of solid second mating elements projecting therefrom, the second mating elements each having a second mating surface wherein a cross-section perpendicular to the second mating surface comprises a plurality of second microridges extending therefrom;

wherein the first and second mating surfaces each have a draft of less than about 10°;

the first and second microridges have a height of no more than about 250 microns and a width of no more than about 250 microns;

at least one of the fastener elements is formed from a resilient material; and the fastener elements are capable of being engaged by an engagement force such that at least one first mating element is retained in a mating cavity defined by adjacent second mating elements by an interlocking interaction of the first and second mating surfaces; and the engaged fastener elements are separable by a disengagement force directly proportional to the engagement force.

23. The fastener of claim 22 wherein the first fastener element is formed from a resilient material and the second fastener element is formed from a rigid material.

24. The fastener of claim 22 wherein the first microprotrusions comprise undercut-shaped microprotrusions.

25. A fastener comprising first and second fastener elements;

the first fastener element comprising a first unitary polymeric substrate having a plurality of first mating elements projecting therefrom, the first mating elements each having a first mating surface wherein a cross-section perpendicular to the first mating surface comprises a plurality of randomly oriented first microprotrusions extending therefrom;

the second fastener element comprising a second unitary polymeric substrate having a plurality of second mating elements projecting therefrom, the second mating elements each having a second mating surface wherein a cross-section perpendicular to the second mating surface comprises a plurality of randomly oriented second microprotrusions extending therefrom; and wherein the fastener elements are capable of being engaged by an engagement force such that at least one first mating element is retained in a mating cavity defined by adjacent second mating elements by an interlocking interaction of a multiplicity of the first and second microprotrusions; and the engaged fastener elements are separable by a disengagement force having a direct, continuous relationship to the engagement force.

26. A method of fastening an article comprising:

(a) providing a first and second fastener elements attached to the article;

the first fastener element comprising a first unitary polymeric substrate having a plurality of solid first mating elements projecting therefrom, the first mating elements each having a first mating surface, wherein a cross-section perpendicular to the first mating surface comprises a plurality of first microprotrusions extending therefrom, and the first microprotrusions are capable of flexing in a leaf spring-like manner;

the second fastener element comprising a second unitary polymeric substrate having a plurality of solid second mating elements projecting therefrom, the second mating elements each having a second mating surface wherein a cross-section perpendicular to the second mating surface comprises a plurality of second microprotrusions extending therefrom, and the second microprotrusions are capable of flexing in a leaf spring-like manner; and (b) applying an engagement force to the first and second fastener elements such that at least one first mating element is retained in a mating cavity defined by adjacent second mating elements by an interlocking interaction of the first and second mating surfaces;

wherein the engaged fastener elements are separable by a disengagement force directly proportional to the engagement force.

27. The method of claim 26 wherein the engaged fastener elements are separable by a disengagement force directly proportional to the number of first microprotrusions interlockingly engaged with the second microprotrusions.

* * * * *